United States Patent
Taylor, Jr.

(10) Patent No.: US 8,608,406 B2
(45) Date of Patent: Dec. 17, 2013

(54) LANDING MECHANISM FOR LIFTED PIPE REEL

(75) Inventor: Leland Harris Taylor, Jr., Houston, TX (US)

(73) Assignee: J. Ray McDermott, S.A., Houston, TX (US)

( * ) Notice: Subject to any disclaimer, the term of this patent is extended or adjusted under 35 U.S.C. 154(b) by 311 days.

(21) Appl. No.: 13/031,405

(22) Filed: Feb. 21, 2011

(65) Prior Publication Data

US 2011/0217124 A1 Sep. 8, 2011

Related U.S. Application Data

(60) Provisional application No. 61/310,798, filed on Mar. 5, 2010.

(51) Int. Cl.
*F16L 1/12* (2006.01)

(52) U.S. Cl.
USPC ........ 405/168.3; 405/158; 405/166; 242/394; 242/566

(58) Field of Classification Search
USPC ........................ 405/158, 168.3, 166; 248/618; 248/632–633; 242/134, 156, 394, 406, 564, 242/566, 595
See application file for complete search history.

(56) References Cited

U.S. PATENT DOCUMENTS

| | | | | |
|---|---|---|---|---|
| 4,187,573 A | * | 2/1980 | Fyfe et al. | 14/73.5 |
| 4,345,855 A | * | 8/1982 | Uyeda et al. | 405/168.3 |
| 4,538,937 A | * | 9/1985 | Lynch | 405/168.3 |
| 5,573,353 A | * | 11/1996 | Recalde | 405/168.3 |
| 7,581,904 B2 | * | 9/2009 | Bursaux et al. | 405/166 |

* cited by examiner

*Primary Examiner* — John Kreck
*Assistant Examiner* — Carib Oquendo
(74) *Attorney, Agent, or Firm* — D. Neil LaHaye

(57) ABSTRACT

A reeled pipe storage reel with a large diameter hollow cylindrical shaft, reel shaft bearing support structures installed on the vessel, and a reel drive arrangement mounted on the vessel. The shaft across the width of the reel provides structural stiffness and consistent alignment of the bearings on each end of the shaft. Each end of the shaft extends beyond the reel and includes a section for connection to a lifting sling, a section for the machine bearing surface, and a section for absorbing initial contact with the vessel during installation. The reel shaft bearing support structures on the vessel include a fixed portion to match the bearing area of the reel shaft and a movable portion to absorb initial contact during installation of the reel. The reel drive arrangement is located on linkages so they can be manipulated in the plane of the reel flange for movement into engagement with the drive gear on the reel flange.

7 Claims, 6 Drawing Sheets

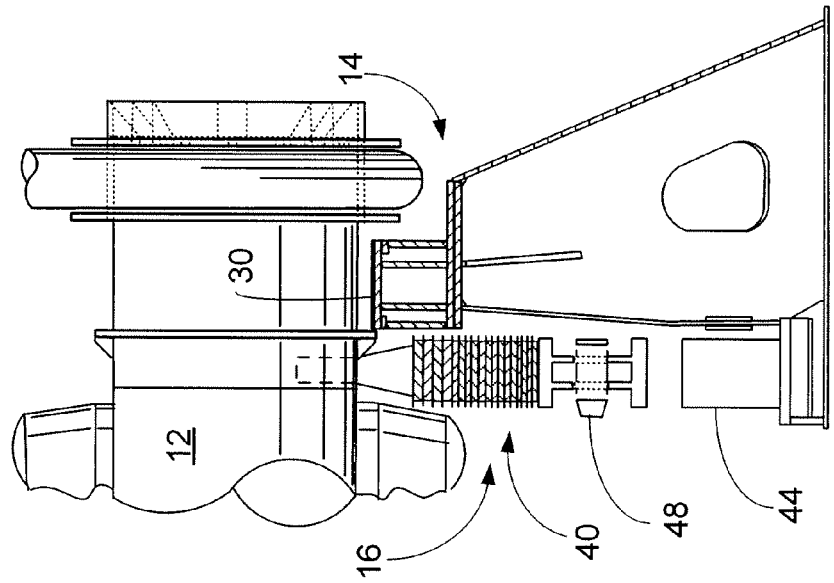
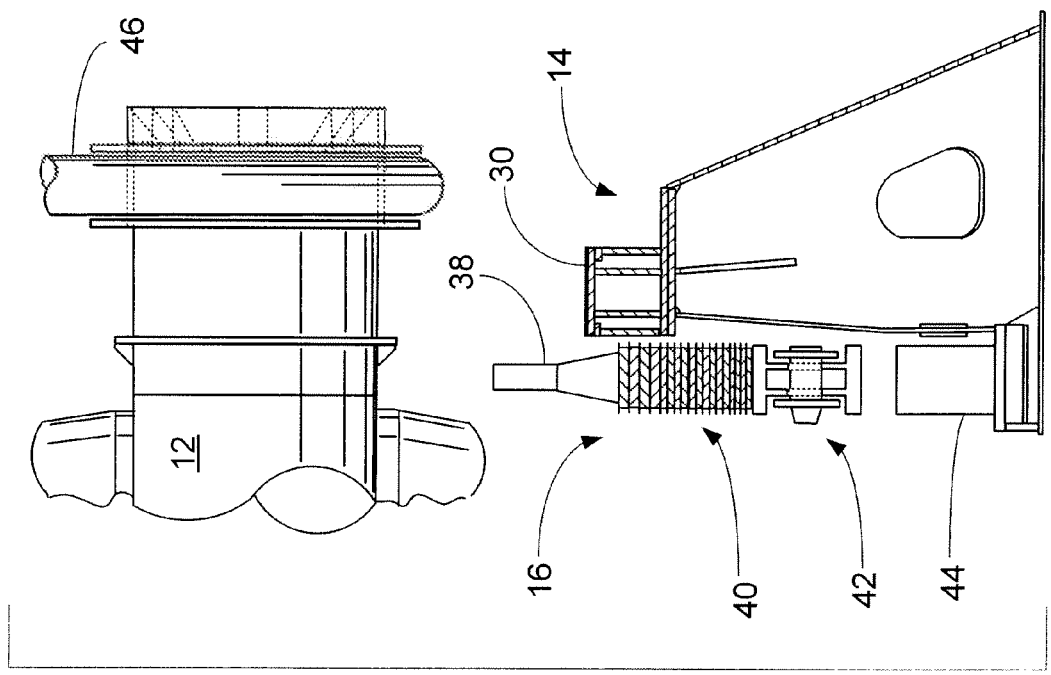

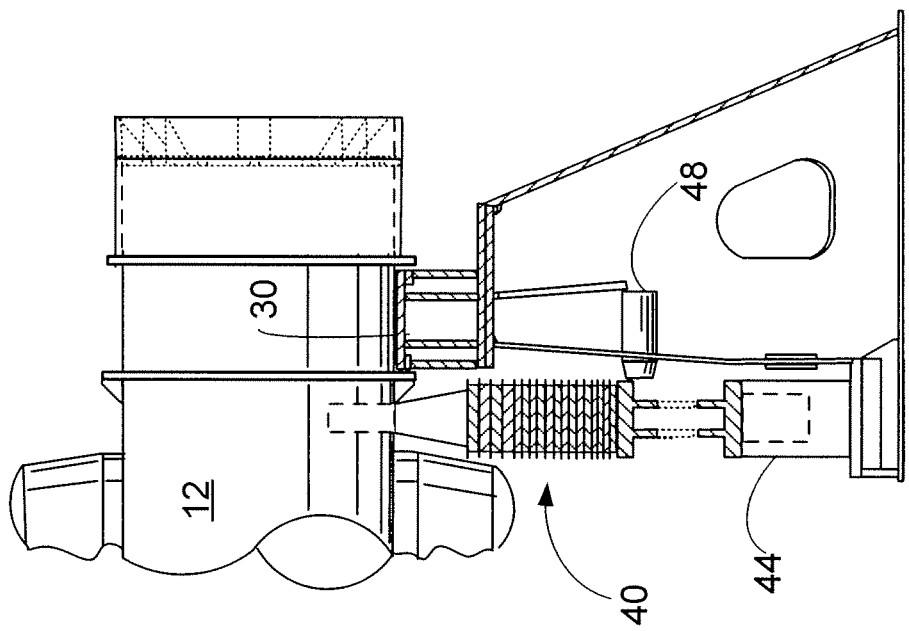
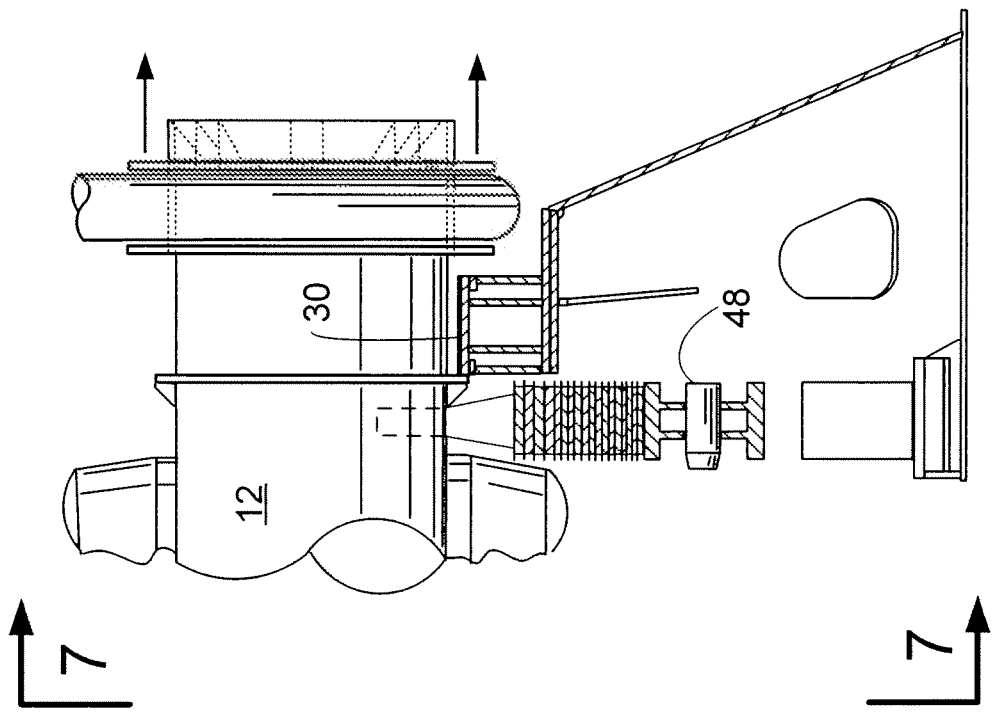

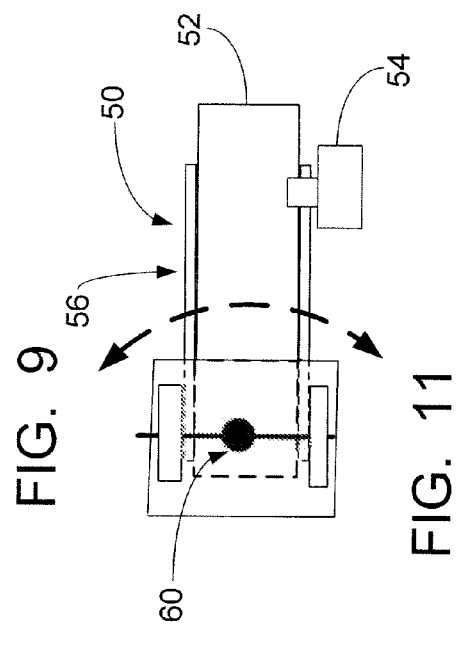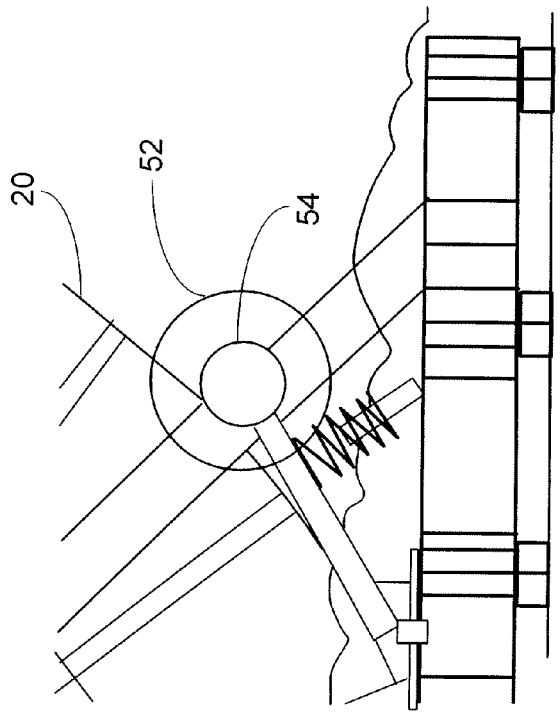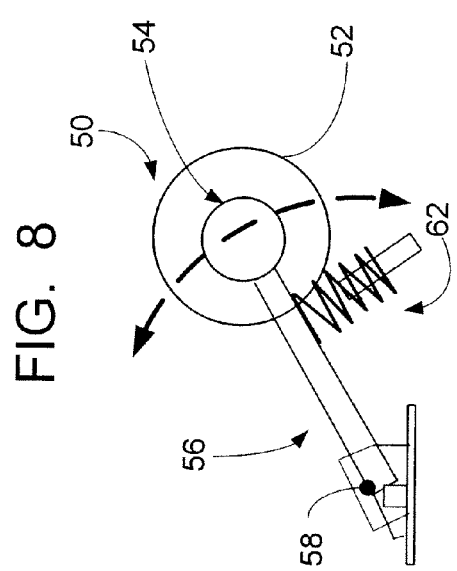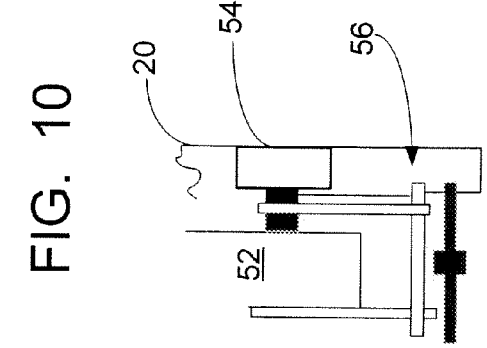

LANDING MECHANISM FOR LIFTED PIPE REEL

PRIORITY CLAIM

This application claims priority from Provisional Application Ser. No. 61/310,798 filed Mar. 5, 2010.

FIELD AND BACKGROUND OF INVENTION

The invention is generally related to the installation of pipeline offshore and more particularly to the reel structures used in such installations.

The installation of submarine pipelines by reeling of steel pipe on to a reel, transporting the loaded reel to the pipeline installation site and un-reeling the pipe from a marine vessel offshore is a well established art. The cost advantages of reeled pipeline installation compared to other means of submarine pipeline installation include reduced amount of labor required to work offshore, a reduced amount of marine equipment and vessels required to support the installation operations, and faster pipeline installation speeds which reduce the exposure of the installation to offshore weather delays.

Key to the reeled pipeline installation method is the process of joining by welding up normally manufactured lengths of steel pipe joints into a continuous string of pipe which can then be reeled ("spooled") up on to the pipe reel. Because of the strains in the steel pipe due to reeling, the weld quality must be superior to pipe welds typically used for non-reeled pipeline installations. This requires a large onshore facility (to store long strings of pipe) and a highly skilled work force. Such a facility is known as a "pipe spooling base". Longer strings are preferred because this reduces the number of times the reeling on process must be stopped to allow another string of pipe to be welded on.

Unless the pipe reel is small enough that it can practically be shipped and loaded onto the vessel, the reeled pipe lay vessel must transit to/from the pipe spooling base so as to allow the pipe to be reeled up onto a reel installed on the vessel.

Once at the pipe spooling base, the pipe lay vessel must then stand by as the initial pipe string is engaged on the reel, reeled up, the subsequent string welded on to the end of the string previously reeled on to the reel, and the repeat of the welding and reeling on process until such time as the reel is fully loaded with strings of pipe. Once loaded, the pipe lay vessel must then transit to the pipeline installation site.

In order to expediently reel up pipe on the pipe lay vessel the pipe spooling base facility must provide long stalks of pipe, thereby minimizing the amount of time spent welding on strings of pipe.

The need for the reeled pipe lay vessel to transit to a distant pipe spool base, the high fixed cost of establishing such a facility with a long pipe string storage capacity and the need for the vessel to stand by during the reeling up of the pipe are the primary economic cost drivers of reeled pipe lay installation for larger reeled pipelines. In order to decrease the amount of reeled pipe lay vessel travel cost to/from the pipe spool base, additional fixed operating cost must be incurred to build more pipe spooling bases closer to the pipeline installation sites.

For smaller sized pipe (including coiled steel tubing which can be used in pipeline service) smaller reels can be loaded with pipe onshore at a central reeling facility and the smaller reels lifted and transported to a suitable location where they can be situated on a suitable pipe lay vessel.

In such cases where small reels are used, under-roller machines used to support and rotate the reel from the rim of the reel or a machine used to engage the reel axis on a reel stand are used. The machines used to handle small reels of pipe can be mounted on any suitably sized vessel of opportunity to allow that vessel to work as a reeled pipe lay vessel. The reel handling machines used with such small reels are typical of machines used to dispense coiled tubing during oil well down-hole tubing operations and the laying of flexible pipelines. The foregoing allows smaller pipelines to be reeled at locations remote (such as a single central location) from where the installation vessel may eventually be loaded with the small reels. This removes the economic disadvantage of needing to take the installation vessel to the point where the pipe is reeled up or establishing and operating multiple spool bases.

For larger pipelines installed by the reeled pipe lay method, large reels are typically installed permanently to vessels dedicated to reeled pipe lay installations. The installation of the reels on these vessels is essentially permanent because the reel support structure must be very robust to tolerate the dynamic loads acting on the reel due to movements of the vessel in the seaway. These dedicated vessels must transit to and from distant reeling bases in order to reel up pipe, or costly reeling facilities must be established to otherwise minimize the transit distance sailed by the reeled pipe lay vessel.

The large reels must be installed on the reeled pipe lay vessel using substantial bearings and drive systems to insure robust mechanical performance of the system during reeling operations. These systems must precisely engage the reel to perform reliably. When lifting large loaded reels of pipe onto the vessel these systems are at risk of damage due to incidental contact and impact loads. Large reels loaded with pipe typically weigh 2,500 tons. The present invention is directed to a reel capable of a loaded 3,000 ton weight. Impact damage to the bearings and drive systems will result in mechanical problems and aborted reeling operations corresponding to a great financial risk.

Because of the technical challenges related to lifting and landing large loaded reels on to a reeled pipe lay vessel there has been little practical use of large lifted reels for reeled pipeline installations.

As such, all of the dedicated reeled pipe lay vessels currently in service have reels which are permanently installed on the vessel and the vessel must load pipe by reeling up pipe from a reeling facility and the operators of these dedicated reeled pipe lay vessels have established a multitude of pipe spooling bases around the world to support the vessels and reduce vessel travel cost/time. Another disadvantage of vessels dedicated to laying of large pipe is that the large drums required for large rigid pipe limits the versatility of these vessels by limiting the capacity of flexible pipe or tubing that may be placed on reels with the larger drums even though the flexible pipe or tubing has greater bending capability than steel pipe and does not require the larger drum.

From the above, it is readily understood that there is a need for the ability to supply reeled pipe onto a reel lay vessel that is more time and cost efficient than having the vessel make multiple trips to pipe welding and spooling base and/or having multiple, expensive pipe spooling bases around the world.

SUMMARY OF INVENTION

The present invention addresses the issues related to the lifting, landing, and interchanging of large, heavy pipe reels on a dedicated reeled pipe laying vessel and provides a reeled pipe storage reel with a large diameter hollow cylindrical shaft, reel shaft bearing support structures installed on the vessel, and a reel drive arrangement mounted on the vessel. The shaft across the width of the reel provides structural stiffness and consistent alignment of the bearings on each end of the shaft. Each end of the shaft extends beyond the reel and includes a section for connection to a lifting sling, a section for the machine bearing surface, and a section for absorbing initial contact with the vessel during installation. The reel shaft bearing support structures on the vessel include a fixed portion to match the bearing area of the reel shaft and a movable portion to absorb initial contact during installation of the reel. The reel drive arrangement is located on linkages so they can be manipulated in the plane of the reel flange for movement into engagement with the drive gear on the reel flange.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same:

FIG. 3-6 are detailed views that illustrate the operation of the reel support during loading of a reel.

FIG. 8-11 illustrate the drive arrangement for the reel.

DESCRIPTION OF THE PREFERRED EMBODIMENTS

Figure 1:
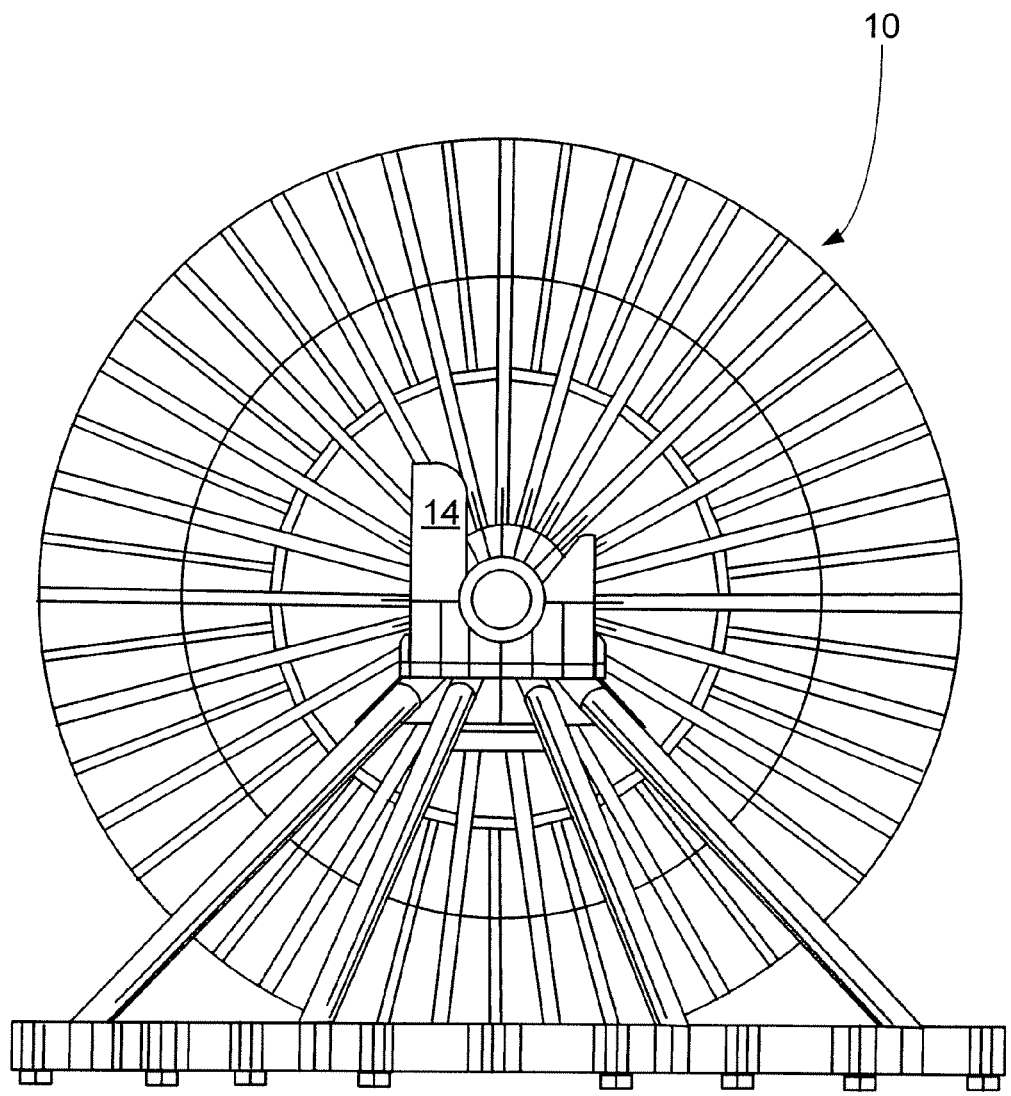
FIG. 1 is a side elevation view that illustrates the reel support general arrangement.

FIG. 1 is a side elevation view that generally illustrates the arrangement of the invention. As seen in FIG. 1-4, the invention is generally comprised of a reeled pipe storage reel 10 with a large diameter hollow, ring stiffened, cylindrical shaft 12, reel shaft bearing support structures 14 installed on the vessel, reel shaft landing apparatus 16, and a reel drive arrangement 50 (FIG. 8) installed on the vessel.

Figure 2:
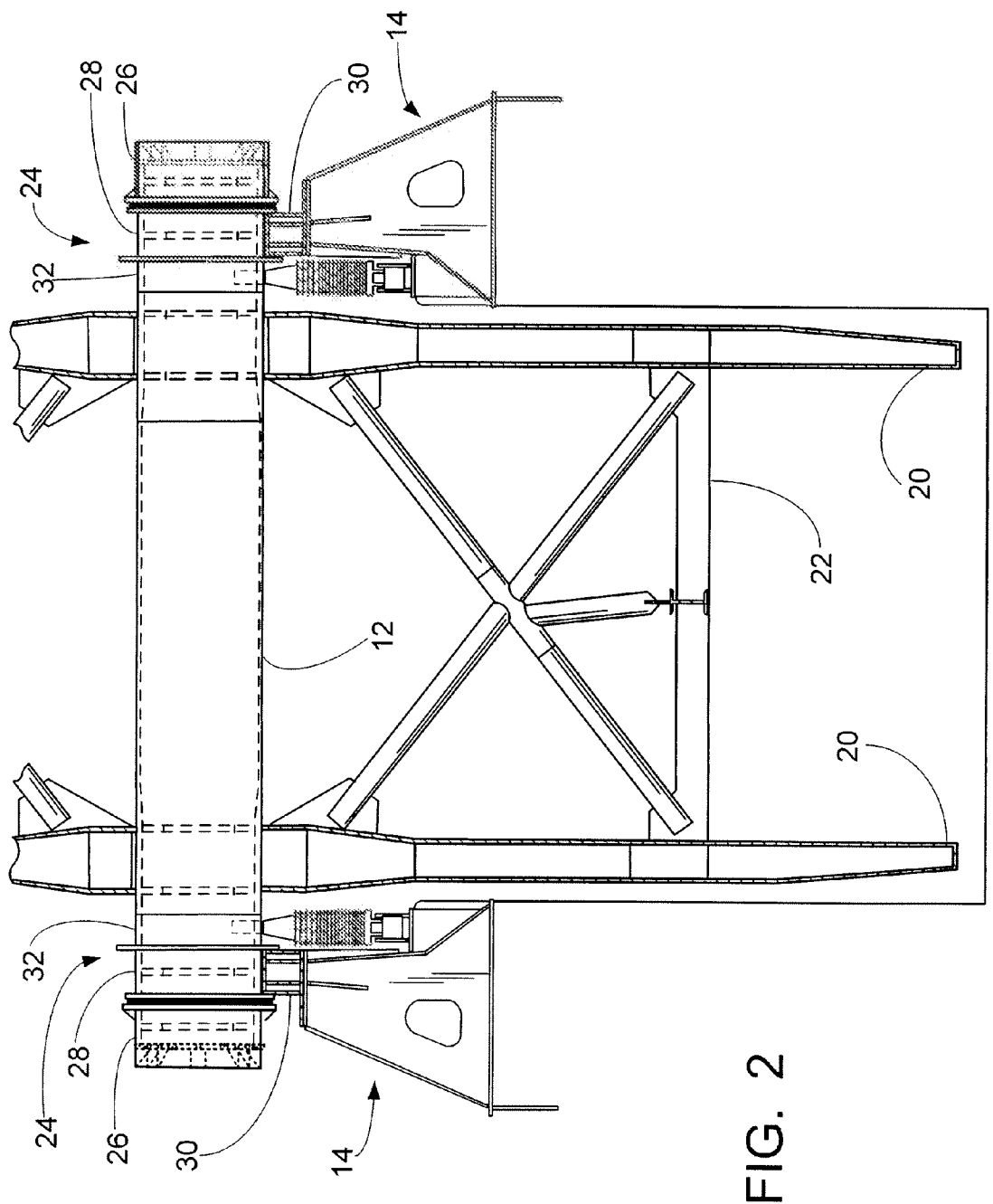
FIG. 2 is a partial elevation view rotated 90 degrees from FIG. 1 that illustrates the reel support general arrangement.

The general construction of pipe reels is known in the industry. As seen in FIG. 2, a pipe reel 10 is generally comprised of a central cylindrical shaft 12, flanges 20, and a drum 22. The flanges 20 are received on and spaced apart near each end of the shaft 12. The drum 22 is rigidly attached between the flanges 20 and has a diameter sized to allow bending and reeling of steel or flexible pipe onto the drum 22 between the flanges 20 without causing buckling of the pipe. The large diameter hollow cylindrical shaft 12 spans the entire width of the drum 22 to provide structural stiffness and provide consistent alignment of the bearings 24 fitted on each end of the shaft 12.

Each end of the shaft 12 extends beyond the flanges 20 (both sides of the reel 10). A difference from pipe reels fixed on vessels is that each end of the axle 12 has three distinct segments. The outermost segment 26 is designed for connection to a lifting sling or lift ring. The middle segment 28 is designed to be received on the rotational bearings 30 of the bearing support structures 14 installed on the vessel. The innermost segment 32 is located so as to be received on the reel shaft landing apparatus 16 referenced above. The pipe storage reel 10 may be provided with a standardized drive gear around the rim on either or both of the reel flanges 20.

The reel shaft bearing support structures 14 (FIG. 2) installed on the vessel support the reel 10 when it is installed on the vessel for rotation and reeling out of pipe. Each bearing support structure 14 contains two elements: one fixed portion and one portion that can be actuated vertically.

Figure 7:
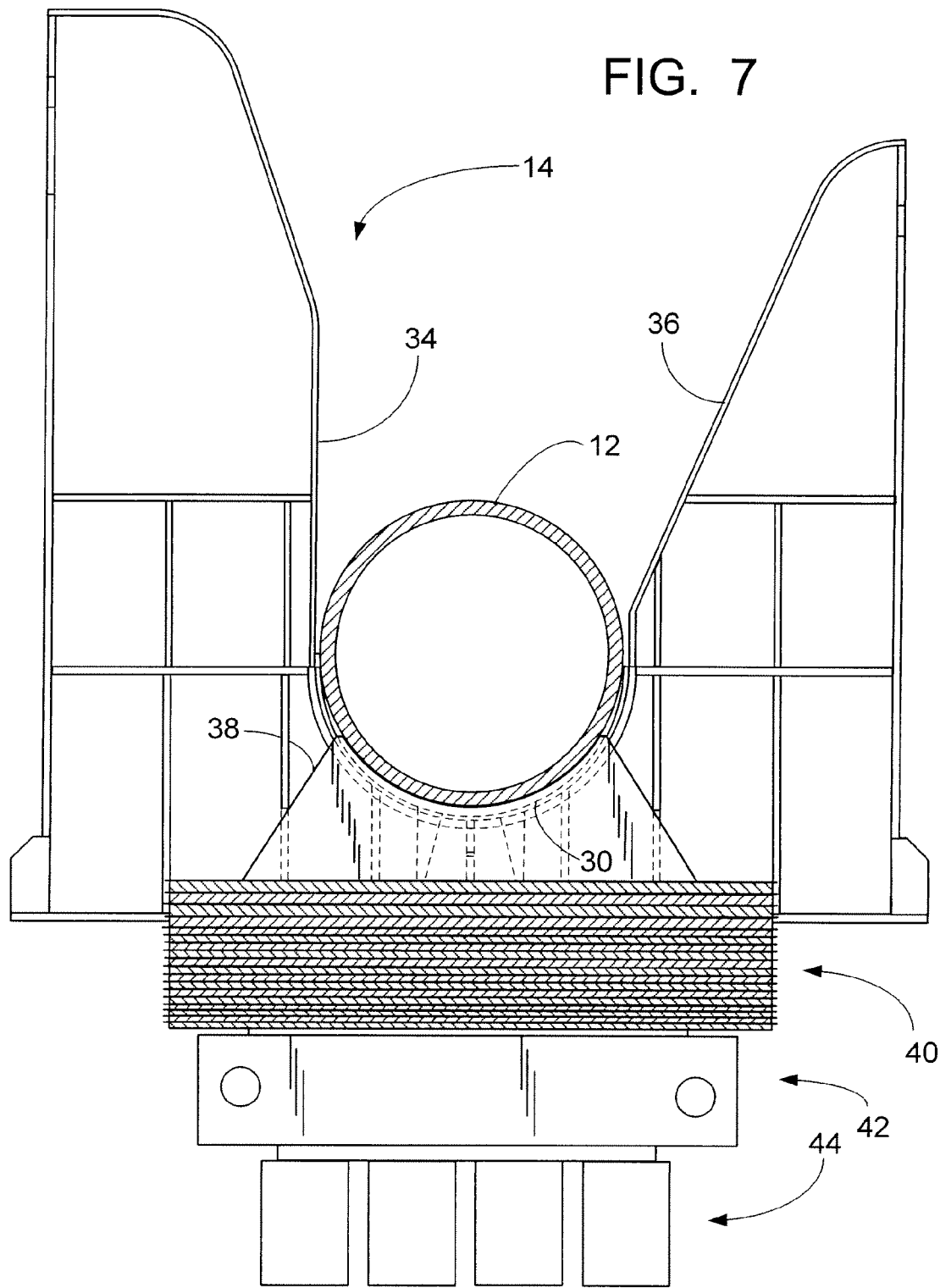
FIG. 7 is an enlarged view taken along lines 7-7 in FIG. 5.

As seen in FIG. 1-3, the fixed portion supports an open cup rotational bearing surface 30 which has precisely machined tolerances to match the machined tolerance of the bearing area of the reel shaft 12. The fixed portion also has a rigid structural steel vertical guide 34 and an inclined steel guide 36 (FIG. 7), both guides preferably being clad with ultra-high molecular weight polyethylene to reduce friction and point contact loads in the event of any incidental contact when the reel 10 is being lowered on to the vessel.

As best seen in FIG. 3-7, the portion that can be actuated vertically (the reel shaft landing apparatus 16) includes a bearing or landing cup 38, a foundation 40 of either springs and/or elastomers, locking means 42 for selectively limiting vertical motion, and means 44 for selectively causing vertical motion. The bearing cup 38 is shaped and sized to receive the innermost section 32 of shaft 12 with sufficient stiffness to eliminate the risk of high impact loads between the vessel and the reel shaft 12 due to differences in relative vertical motion.

The landing cup 38 and its elastic foundation 40 (FIGS. 3 and 7) are assembled in a cartridge installed within the bearing support structure such that it can be actuated vertically using vertical motion means 44, hydraulic pistons or jacks, so as to raise the support cup 38 above the fixed reel rotational bearing 30. This insures the reel shaft bearing cannot come into contact with the fixed reel rotational bearing support when the reel 10 is being lowered into the landing cups 38. The assembly of the landing cup inserted in the cartridge is hereinafter known as the "reel soft landing device" (RSLD). The vertical travel distance of the landing cup 38 within the RSLD will allow the reel shaft 12 to be supported nominally a preselected short distance above its final engagement position with the cup rotational bearing 30. As seen in the drawings, the RSLD is preferably installed inboard of the cup rotational bearing 30. When the RSLD is actuated upward and has lifted the shaft 12 clear of the rotational bearing 30, the rotational bearing 30 is accessible for servicing and/or change out.

FIG. 3-6 illustrate the sequence during the installation of a reel. In FIG. 3 the reel 10 is lifted and supported at each end of the shaft 12 by a sling 46. In FIGS. 4 and 5 the shaft 12 is lowered into contact with and supported by the bearing cup 38. The foundation 40 compresses and absorbs impact and the weight of the loaded reel 10 while preventing contact of the shaft 12 with the rotational bearing 30. In FIG. 6 the pin 48 of locking means 42 has been retracted to allow the shaft 12 to continue movement into contact with the rotational bearing 30.

Having the ability to remove and install a pipe reel means the reel drive equipment must be capable of being disengaged from the reel during reel removal and installation operations to prevent damage to both the reel and reel drive equipment. The invention provides a retractable and self-aligning reel drive arrangement.

The reel drive arrangement 50, FIGS. 8-11, includes at least one motor 52 mounted on the vessel and to which a drive gear 54 is connected. The motor 52 is preferably located on linkages 56 connected to the vessel such that they can be manipulated in the plane of the flange 20 of the pipe reel 10 so as to move into engagement with the drive gear 54 on the flange 20 of the pipe reel 10. During lifting or landing of the pipe reel 10, the motor 52 is retracted from engagement with the reel drive gear. The linkages 56 are pinned universally to the vessel in two axes: one axis being transversely perpendicular to the tangential trajectory of the reel rim rotation and the other axis perpendicular relative to the axis of rotation of the reel. The first axis 58 (rotation indication by arrows) allow the linkage to be actuated into or away from engagement with the reel rim gear and the second axis 60 (rotation indicated by arrows) allows the linkage 56 to swing as needed to keep the drive gear engaged in the reel rim gear even if the path of the reel rim gear is not in a perfect plane due to global movement of the reel due to the tolerance required for a practical interchangeable fit and movement due to the elastic deflection and practical tolerances of such a large gear on such an interchangeable and pliable shell structure of a large reel.

Retraction of the reel drive arrangement 50 away from and toward the reel 10 during lifting and/or landing is accomplished by selectively moving the drive motor 52 and gear 54 away from the normal point of engagement during pipe laying operations. Means 62 for maintaining pressure of the drive gear 54 against the reel drive gear during pipe laying operations is indicated schematically in FIGS. 8 and 11 and may use springs or hydraulics.

The invention provides a number of advantages.

The invention allows a large reel of pipe to be safely lifted and landed in position or removed from a dedicated reeled pipe lay vessel and reduces the risk of damage to the reel bearing and reel drive arrangements installed on the reeled pipe lay vessel. This provides the economic advantage of interchanging of reels on a reeled pipe lay vessel to be realized.

The invention allows more reels to be used interchangeably with more than one reeled pipe lay vessel. This allows the following, which reduces certain operating economics related to reeled pipe line installations:

The reeling up of pipe on the reel without requiring the reeled pipe lay vessel to stand by waiting for the reeling up process. This reduces the stand-by cost of the reeled pipe lay vessel.

Because stalk length is no longer a factor in causing standby of the reeled pipe lay vessel during reeling up, pipe string stalks can be shorter. This allows a pipe spooling facility to be established in a productive manner in a much smaller, less obtrusive, land space.

This allows an inventory of pipelines to be stored on one or more of the interchangeable reels. This avoids the need to maintain a large storage area for strings of pipe. This allows a pipe spooling facility to be established in a productive manner with a much smaller land space.

This allows an inventory of pipelines to be stored on one or more of the interchangeable reels. These reels can then be shipped to a remote location closer to the installation site and loaded one at a time onto the reeled pipe lay vessel. These remote locations only need have sufficient lifting methods for loading and unloading the reels from the reeled pipe lay vessel.

The use of interchangeable reels allows reels of various reel drum diameters to be constructed and employed on the vessel. The reel drum diameter determines the strain incurred in the reeled pipe product. Allowing a vessel to use reels of various drum diameter allows minimizing strain in the pipe product while still meeting pipe product payload needs. This also increases the versatility of a vessel with the invention because the vessel is not limited to laying only one type of pipe such as steel pipe or flexible pipe.

The RSLD allows the maintenance/repair of the reel rotational bearing when the reel is full loaded without the need of outside equipment. This will reduce mechanical breakdown risk and maintenance cost in general.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed as invention is:

1. An arrangement for lifting and landing a pipe reel loaded with pipe on a reeled pipe lay vessel, comprising:
    a. the pipe reel comprised of a drum, flanges, and a central shaft that extends beyond both sides of the flanges, with each end of the central shaft having an outer segment for connection to a lifting apparatus, a middle segment to be received on rotational bearings on the lay vessel, and an inner segment to be received on a landing mechanism;
    b. the landing mechanism being separate from rotational bearings on the vessel for the pipe reel and that absorbs a landing load of the pipe reel loaded with pipe and that prevents contact of the reel central shaft with rotational bearings on the vessel during landing of the pipe reel;
    c. means for selective vertical motion of the landing mechanism during lifting or landing of the pipe reel; and
    d. a reel bearing support apparatus for supporting the pipe reel during pipe laying operations.

2. The arrangement of claim 1, wherein said landing mechanism comprises:
    a. a bearing cup sized to receive the shaft of the pipe reel;
    b. a foundation attached to the bearing cup and designed to absorb the landing load of the pipe reel; and
    c. releasable locking means attached to the foundation for selectively limiting the vertical motion of the bearing cup, foundation, and pipe reel.

3. The arrangement of claim 2, wherein the foundation is comprised of elastomers.

4. The arrangement of claim 2, wherein the means for selectively moving the landing mechanism vertically comprises at least one jack.

5. An arrangement for lifting and landing a pipe reel loaded with pipe on a reeled pipe lay vessel, comprising:
    a. the pipe reel comprised of a drum, flanges, and a central shaft that extends beyond both sides of the flanges, with each end of the central shaft having an outer segment for connection to a lifting apparatus, a middle segment to be received on rotational bearings on the lay vessel, and an inner segment to be received on a landing mechanism;
    b. the landing mechanism being separate from rotational bearings on the vessel for the pipe reel and that absorbs a landing load of the pipe reel loaded with pipe and that prevents contact of the reel central shaft with rotational bearings on the vessel during landing of the pipe reel, comprising;
        i. a bearing cup sized to receive the shaft of the pipe reel;
        ii. a foundation attached to the bearing cup and having elastomers designed to absorb the landing load of the pipe reel; and
        iii. releasable locking means attached to the foundation for selectively limiting the vertical motion of the bearing cup, foundation, and pipe reel;
    c. means for selective vertical motion of the landing mechanism during lifting or landing of the pipe reel; and d. a reel bearing support apparatus for supporting the pipe reel during pipe laying operations.

6. The arrangement of claim 5, wherein the means for selectively moving the landing mechanism vertically comprises at least one jack.

7. An arrangement for lifting and landing a pipe reel loaded with pipe on a reeled pipe lay vessel, comprising:
- a. the pipe reel comprised of a drum, flanges, and a central shaft that extends beyond both sides of the flanges, with each end of the central shaft having an outer segment for connection to a lilting apparatus, a middle segment to be received on rotational bearings on the lay vessel, and an inner segment to be received on a landing mechanism;
- b. the landing mechanism being separate from rotational bearings on the vessel for the pipe reel and that absorbs a landing load of the pipe reel loaded with pipe and that prevents contact of the reel central shaft with rotational bearings on the vessel during landing of the pipe reel, comprising:
   - i. a bearing cup sized to receive the shaft of the pipe reel;
   - ii. a foundation attached to the hearing cup and having elastomers designed to absorb the landing load of the pipe reel; and
   - iii. releasable locking means attached to the foundation for selectively limiting the vertical motion of the bearing cup, foundation, and pipe reel;
- c. means for selective vertical motion of the landing mechanism during lifting or landing of the pipe reel;
- d. a reel bearing support apparatus for supporting the pipe reel during pipe laying operations; and
- e. a reel drive mechanism selectively retractable during lifting and landing operation of a pipe reel.

* * * * *